3,003,449
TORPEDO CONTROL CIRCUIT

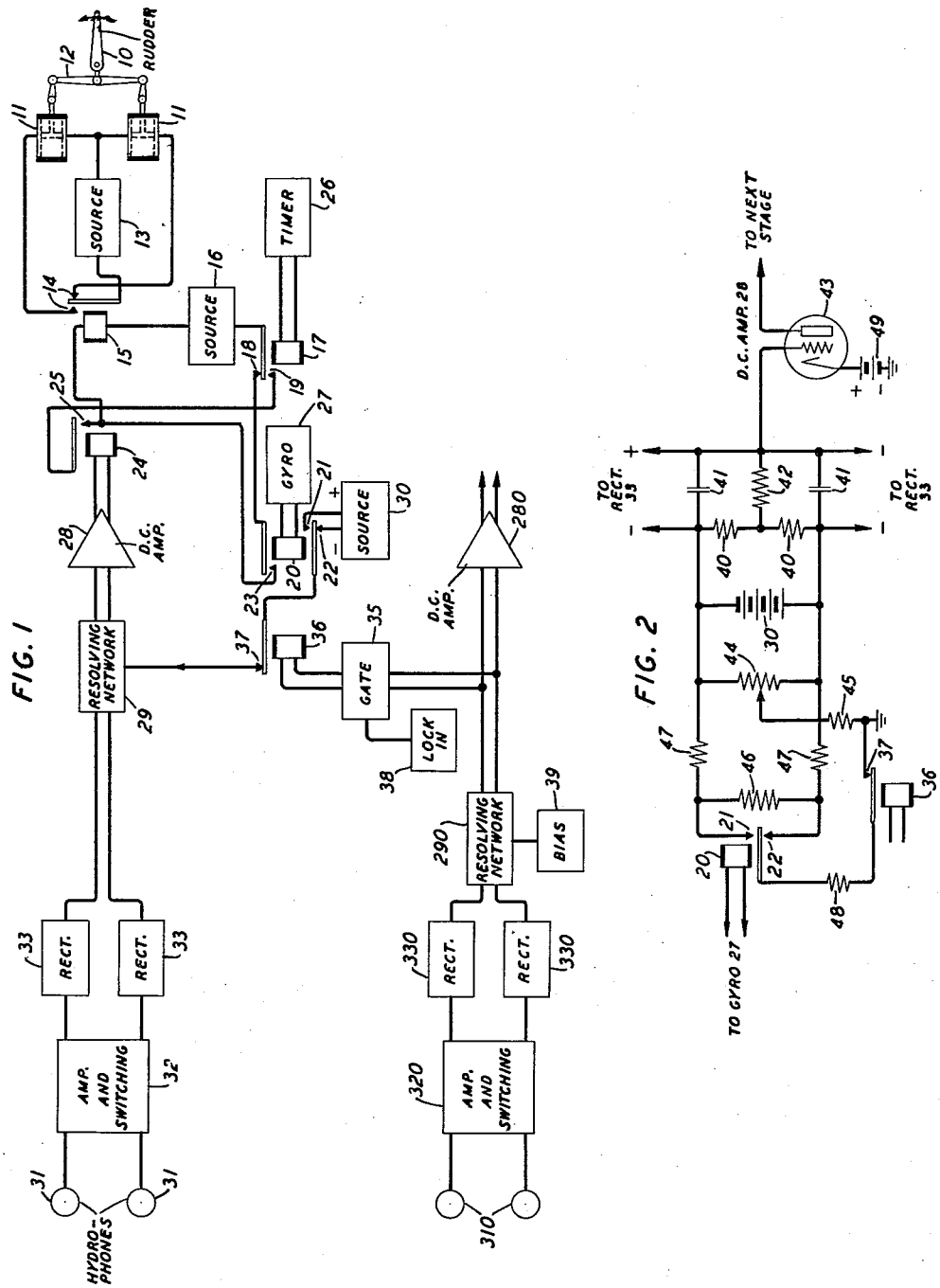

Charles F. Wiebusch, Millington, N.J., assignor to Bell Telephone Laboratories, Incorporated, New York, N.Y., a corporation of New York
Filed June 22, 1945, Ser. No. 600,905
11 Claims. (Cl. 114—23)

This invention relates to control circuits and more particularly to torpedo steering systems of the type wherein the rudder for guiding the torpedo in the horizontal dimension is subject to control either by a gyroscope or in accordance with signals emanating from a target.

In systems of this type, initially after the torpedo is launched, the rudder is under control of a gyroscope and is deflected to maintain the torpedo traveling in a preassigned direction, for example in the direction in which it is launched. After the torpedo has traveled some distance from the launching vessel, control of the rudder is transferred to a signal translating system responsive to signals emanating from a target, such as propeller and ship noises, and effective to deflect the rudder to guide the torpedo to the target. The translating system comprises a pair of hydrophones so mounted on the torpedo that the relative outputs of the two are a measure of the bearing of the target relative to the torpedo. The hydrophone outputs are converted into a difference signal of amplitude dependent upon the horizontal angle between the longitudinal axis of the torpedo and a line joining the torpedo and target and of polarity determined by the sign of this angle.

The point in the path traversed by the device at which transfer of the rudder from gyroscope to target signal control occurs may be fixed by a parameter of the signals received by the hydrophones; for example, transfer may occur when the target signal level at the hydrophones is of at least a preassigned magnitude or it may occur when the difference signal is of at least a prescribed amplitude. Transfer determined by the magnitude of the signal level entails inherently a restriction of the range at which the rudder may be connected to control in accordance with target signals. This follows from the fact that the transfer element must be set to allow for torpedo self-noise and ambient submarine signals so that transfer can be effected only when the total signal level at the hydrophones is somewhat above the target signal level for which the signal translating system is capable of controlling the rudder in accordance with signals received by the hydrophones, in the presence of self-noise and ambient submarine signals. Such restriction of the range at which rudder control in accordance with target signals may be initiated is substantially reduced in systems where transfer is effected upon the basis of the difference in magnitude of the target signals impinging on the two hydrophones.

One general object of this invention is to improve the performance of torpedoes having steering systems of the type above-described. More specific objects of this invention are to increase the target signal control range of such torpedoes and to improve and simplify the rudder control portion of such systems.

In accordance with one feature of this invention, in a rudder control system including gyroscope and target signal controls, the two controls are so constructed and arranged that initially after launching of the torpedo the rudder is under control of the gyroscope alone, whereby the torpedo is maintained upon a preset course, and subsequently at a point in the path determined by the target difference signal, the rudder is transferred from gyroscope control alone to joint control by the gyroscope and target signals. More specifically, in accordance with one feature of this invention, the two controls above-noted are associated so that when the target difference signal is below a preassigned value, the rudder is gyroscope controlled whereas when the difference signal is above this value, the rudder is target signal controlled, whereby the torpedo is steered along a course for which, on the average, the gyroscope and target signal controls are substantially equal.

In accordance with another feature of this invention, means are provided for disabling the gyroscope control in response to a signal from the target indicative of the arrival of the torpedo at a point at which the target is at a preassigned angle in the vertical dimension with respect to the torpedo. The preassigned angle is, of course, equivalent to a preassigned range whenever the depth of the target is accurately determinable. Additionally, the preassigned angle is substantially equivalent to a preassigned range if the running depth of the torpedo is relatively great in comparison to any error in the determination of target depth. In one illustrative embodiment this feature of the invention comprises a gate element which is responsive to the elevator control system of the torpedo.

The invention and the above-noted and other features thereof will be understood more clearly and fully from the following detailed description with reference to the accompanying drawing in which:

FIG. 1 is a schematic, partly in functional block form, of a torpedo steering system illustrative of one embodiment of this invention; and FIG. 2 is a circuit diagram showing details of a portion of the system illustrated in FIG. 1.

Referring now to the drawing, the steering system illustrated therein comprises a rudder 10 which is deflectable in opposite directions to steer the torpedo in the horizontal dimension, by a pair of solenoids 11 having armatures coupled to the rudder by a suitable linkage 12. The solenoids have one terminal connected in common to a source 13 and the other terminal of each is connected to the respective contact 14 of a control relay 15, the armature of which is connected to the source 13 as shown. Thus, as is apparent, the direction of deflection of the rudder 10 is determined by which of the solenoids is energized and this is determined in turn by the condition of the control relay 15.

The relay 15 is arranged to be energized from a source 16 included in a control network comprising an enabler relay 17 having transfer contacts 18 and 19, a relay 20 having transfer contacts 21 and 22 and a third contact 23, and an auxiliary relay 24 having a contact 25. The enabler relay 17 normally is deenergized and is arranged to be energized to transfer its armature from contact 18 to contact 19 by operation of a timer element 26. This element is set to operate at the end of a preassigned interval following launching of the torpedo, e.g., an interval of sufficient duration to allow the torpedo to travel, after launching, beyond the effective signal field of the launching vessel.

The relay 20 is controlled by a gyroscope 27 in such manner that this relay operates or releases in accordance with the direction of deviation, in the horizontal dimension, of the torpedo from a prescribed course, specifically departure to the left or right from the direction in which the torpedo is launched.

The auxiliary relay 24 is included in the output circuit of a direct current amplifier 28 normally biased at cut-off so that the condition of the relay is determined by the polarity of the input signal supplied to the amplifier from a resolving network 29.

The resolving network receives a direct current signal from a source 30, the signal being of polarity determined by the condition of the relay 20, and other signals, of polarity and amplitude determined by the bearing of the torpedo with respect to the target, obtained from a signal translating system, which may be similar to the translating system shown by J. H. Hammond, Jr. in Patent 1,892,431, issued December 27, 1932. The resolving network 29 converts the several signals into a direct current potential of amplitude and polarity determined by the relative amplitudes and polarities of the several signals.

The signal translating system comprises a pair of hydrophones 31 responsive to submarine signals emanating from a target, e.g. propeller and ship noises, and mounted on opposite sides, i.e., port and starboard, of the torpedo so that the relative outputs of the two hydrophones are a measure of the bearing of the target, e.g. ship, with respect to the torpedo. Outputs from the hydrophones 31 are translated in an amplifier and switching system 32 and supplied to a pair of rectifiers 33 in such manner that each rectifier is energized in accordance with the output of a corresponding one of the hydrophones 31. The rectifier outputs are converted in the resolving network 29 into a resultant potential of amplitude proportional to and polarity determined by the difference of the outputs of the two hydrophones. The amplifier in this system is provided with automatic gain control so that the hydrophone outputs are converted on a relative rather than an absolute intensity basis, whereby the magnitude of the resultant potential noted is substantially independent of the absolute signal level at the hydrophones.

The connection between the source 30 and the resolving network 29 is under control of a gate 35 provided with a lockin 38 and which controls a relay 36 having a contact 37. The gate 35 is energized from the elevator control circuit in such manner that it effects permanent operation of the relay 36 to open the contact 37 when the torpedo reaches a preassigned position relative to the target, specifically, a position such that it is at a prescribed, e.g. at normal, running depth and at substantially a preassigned angle in the vertical dimension with respect to the target. That is to say, the gate 35 causes permanent opening of the contact 37 when the torpedo approaches to within substantially a preassigned distance of the target.

Various specific elevator control circuits may be employed to provide a signal for operation of the gate 35 in the manner described above. An illustrative circuit is disclosed in detail by H. C. Montgomery and J. C. Steinberg in an application, Serial Number 564,340, filed November 20, 1944, so that detailed description of such a circuit here is deemed unnecessary. However, it may be noted that generally such circuit comprises, as illustrated in FIG. 1, a pair of hydrophones 310 mounted above and below the longitudinal axis of the torpedo so that the relative outputs thereof are a measure of the vertical angle between the target and the torpedo, an amplifier and switching system 320 and rectifier 330 similar to the system 32 and rectifiers 33 respectively, and a resolving network 290 similar to the network 29, to which there is applied a bias potential from a source 39. The bias due to the source 39 is such that it corresponds in magnitude and is opposite in polarity to a preassigned up elevator target signal differential due to the hydrophones 310, whereby the resultant potential obtained from the network will be of the polarity corresponding to up elevator and requisite to effect operation of the gate 35 only when the torpedo is at a prescribed angle in the vertical dimension with respect to the target. The torpedo approaches the target initially at a fixed running depth. Hence, as will be apparent, as the torpedo approaches the target, the gate 35 will be operated when the torpedo is at substantially a prescribed distance from the target.

The general operation of the steering system is as follows: When the torpedo is launched, it sinks or rises to its normal running depth and proceeds at this depth in the direction in which it was launched. At this time, the relay 17 is deenergized so that its contact 19 is open and, therefore, the relay 24 cannot affect the condition of the relay 15. The latter relay, hence, is under control of the gyroscope 27, the circuit being traced from the relay 15 to source 16, over contacts 18 and 23 and thence back to the relay 15, whereby the rudder 10 is deflected to maintain the torpedo on course, i.e., in the direction in which it was launched. When the torpedo has receded from the launching vessel a preassigned distance, specifically a distance to place it beyond the effective signal field of the launching vessel so that it will not be steered in the horizontal dimension in response to signals emanating from the vessel, the timer effects operation of the relay 17.

When the relay 17 is thus operated, the previously traced circuit for gyroscope control of the relay 15 is opened at the contact 18 and the relay 15 is transferred to control by the relay 24 over the circuit traced from the relay 15 to source 16, thence over contacts 19 and 25 and back to the relay 15. Thus, as is apparent, the direction of deflection of the rudder 10 will be determined by the condition of the relay 25. This will be determined in turn by the resultant of the control signals due to the hydrophones 31 and the gyroscope 27.

Specifically, the gyroscope operates to impress upon the resolving network 29 a voltage from the source 30 of one polarity or the other, over the contact 21 or 22, tending to result in placing the relay 24 in the condition requisite to bring and maintain the torpedo traveling in the direction in which it was launched. The hydrophones 31, in response to signals emanating from the target, impress upon the resolving network a target difference voltage tending to place the relay 24 in the condition requisite to steer the torpedo toward the target. The condition of the relay 24, then, will be determined by the resultant of the voltage due to operation of the gyroscope and that due to the hydrophones. That is to say, if the voltage supplied to the resolving network 29 from the source 30 is of the polarity opposite to the target difference signal due to the hydrophones, and is greater than this difference signal, the relay 24 will be placed in the condition to effect deflection of the rudder 10 in the direction to bring the torpedo on the gyro course. On the other hand, if the target difference signal predominates, the relay 24 will be placed in the condition to effect deflection of the rudder in the direction to head the torpedo toward the target.

As the torpedo turns in response to a predominating target difference signal, this signal decreases in amplitude with the result that at some point the voltage due to operation of the relay 23 by the gyroscope 27, applied to the resolving network 29 becomes predominant and, hence, the torpedo is turned in the direction to bring it on the gyroscope course. This, in turn, results in an increase in the target difference voltage until this voltage again overcomes the voltage due to the gyroscope operation. Consequently, the torpedo is steered along a path for which the target difference voltage is equal to the voltage due to the operation of the gyroscope. In effect, it is steered along a pursuit course off the target by a number of degrees determined by the voltage of the source 30. Advantageously, this voltage is made such that the off target angle is small, for example of the order of six degrees.

When the torpedo reaches such position relative to the target as to result in operation of the gate 35, the relay 36 operates to open its contact 37 so that the gyroscope is disabled in so far as steering control thereby is concerned. Hence, thereafter the rudder 10 is controlled solely in accordance with target signals received by the hydrophones 31.

It will be appreciated that the point in the path traversed by the torpedo at which, in effect, the target signal responsive portion of the rudder control system is enabled to affect the condition of the relay 24 and thus to produce steering in response to target signals is determined by the target difference signal, specifically when this signal becomes comparable in magnitude to the gyroscope signal derived from the source 30, and not by the absolute level of the signals at the hydrophones 31. Hence, a large effective target signal control range, that is maximum target to torpedo distance at which target signals will affect steering, is realized.

Salient details of an illustrative resolving network and the association of the gyroscope control and rectifiers therewith are shown in FIG. 2. The network comprises equal resistors 40 and equal condensers 41, the latter being bridged across the output of the respective rectifier 33 and connected across a respective resistor 40 by way of a common resistor 42. The resistor 42 is connected, as shown, to the control electrode or grid of the first stage tube 43 of the direct current amplifier 28, the cathode of this tube being connected to ground over a biasing source 49. Bridged across the resistors 40 in series is the source 30 which is in parallel also with a potentiometer resistance 44, the contact arm of which is connected to ground by way of a suitable resistance 45.

The contacts 21 and 22 of the relay 20 are connected to opposite ends of a resistor 46 and to equal resistors 47, the armature of this relay being adapted to be connected to ground over the contact 37 by way of a suitable series resistor 48.

It will be apparent that the potential of the control electrode or grid of the device 43 at any instant is determined by the resultant of several potentials, to wit that due to the bias source 49, those due to the rectifiers 33 and that due to closure of one or the other of the contacts 21 and 22 while the contact 37 is closed. The bias due to the source 49 is made such that normally the device 43 is biased at cut-off. The contact arm of the potentiometer 44 is set to establish an initial balance in the network. The rectifiers 33 are poled relatively as indicated in FIG. 2 so that the two potentials impressed upon the network thereby are in opposing relation. The relay 20 is poled so that the potential impressed upon the network due to closure of one or the other of the contacts 21 and 22 is of the polarity to place the device 43 and, hence, the relay 25, in the condition to result in deflection of the rudder to bring the torpedo upon the gyroscope course. The relative amplitudes of the rectifier and gyroscope controls may be fixed to set the off target angle when the torpedo is under both gyroscope and target signal control at a desired value by adjustment of the resistors 47 and 48.

Of course, when the relay 36 operates, as noted heretofore, the contact 37 is opened so that the gyroscope 27 is disabled from affecting the condition of the device 43 and, therefore, this device is controlled and steering is accomplished in accordance with the difference of the target signals at the two hydrophones, as translated and applied to the network by the rectifiers 33.

Although a specific embodiment of this invention has been shown and described, it will be understood that it is but illustrative and that various modifications may be made therein without departing from the scope and spirit of this invention as defined in the appended claims.

What is claimed is:

1. A control system for a moving body comprising a steering member, means for deflecting said member, means responsive to signals emanating from a target for producing a first control signal having an amplitude and polarity corresponding to the magnitude and direction, respectively, of the angle between the direction of movement of said body and the bearing of said signals with respect to said body, gyroscope controlled means responsive to a deviation between a preselected course and the direction of movement of said body for producing a second control signal having a polarity indicative of the direction of said deviation and a fixed amplitude equal to a preassigned magnitude within the amplitude range of said first control signal, means jointly responsive to said first and second control signals for producing an output signal of a polarity determined by the resultant of the polarities and relative magnitudes of said control signals, and means for applying said output signal to said deflecting member, whereby said steering member is deflected in one or the opposite direction in accordance with the polarity of said output signal.

2. A control system in accordance with claim 1 comprising means for disabling said gyroscope controlled means when the body approaches to within a preassigned range of the target.

3. A steering system for a moving body, comprising a rudder for steering the body horizontally, means for deflecting said rudder laterally in one or the opposite direction in accordance with the polarity of a control signal applied to said deflecting means, means responsive to signals emanating from a target for producing a first signal of amplitude proportional to and polarity determined by the magnitude and sign respectively of the horizontal angle between the target and the body, gyroscope controlled means for producing a second signal of fixed amplitude and of polarity determined by the direction of departure horizontally of the body from a preset course, and means jointly responsive to said first and second signals for producing said control signal, the polarity of said control signal being the resultant of the polarities and relative amplitudes of said first and second signals.

4. Apparatus in accordance with claim 3 including means for disabling said gyroscope means responsive to a signal from said target indicative of the arrival of said body at a point at which said target is at a preassigned angle in the vertical dimension with respect to said body.

5. A steering system for a moving body comprising a steering member, means for actuating said member, first gyroscope controlled means responsive to a difference between the direction of movement of said body and a preset course for exercising sole control over said actuating member for a preset period of time for maintaining said body on a preset course, second means operative upon the termination of said preset period and responsive to the direction of signals emanating from a target source for controlling said actuating member to direct said body toward said source, whereby upon the termination of said period said actuating means is controlled by the resultant action of said first and second means, and means for disabling said first means responsive to a signal from said target indicative of the arrival of said body at a point at which said target is at a preassigned angle in the vertical dimension with respect to said body, whereby said actuating means is made solely responsive to said second means.

6. A steering system for a torpedo, comprising an amplifier having an input circuit including a resistor and a source biasing said amplifier substantially at cut-off, a rudder, means for deflecting said rudder in one or the opposite direction in accordance with the polarity of the potential extant in said input circuit, means responsive to signals emanating from a target for impressing across said resistor a first potential of amplitude proportional to and polarity determined by the bearing of the target with respect to the torpedo and poled to tend to effect deflection of said rudder to steer the torpedo toward the target, and gyroscope controlled means for impressing upon said circuit a second potential of preassigned amplitude, in series with said first potential and of polarity to tend to effect deflection of said rudder to steer the torpedo along a preset course.

7. A steering system in accordance with claim 6 wherein said gyroscope controlled means comprises a relay having an armature and transfer contacts, a source of potential each pole of which is connected to a respective one of said contacts, and a connection between said armature and said resistor.

8. A steering system in accordance with claim 6 wherein said gyroscope controlled means comprises a relay having an armature and transfer contacts, a source of potential each pole of which is connected to a respective one of said contacts, and a connection between said armature and said resistor, said system comprising also means for breaking said connection in response to a signal from said target indicative of the arrival of said torpedo at a point at which said target is at a preassigned angle in the vertical dimension with respect to said torpedo.

9. A steering system for a torpedo, comprising a steering member, means for actuating said member, gyroscope controlled means, a first means controlled by said gyroscope means and normally associated with said actuating means for controlling said actuating means to maintain the torpedo upon a preset course, a second means controlled by said gyroscope means for producing a first direct current control signal of preassigned fixed amplitude and of polarity determined by the direction of departure of the torpedo from said preset course, direct current operated control means normally dissociated from said actuating means and effective when associated therewith for controlling said actuating means in accordance with the polarity of the potential applied to said control means, means responsive to signals emanating from a target for producing a second direct current control signal of amplitude proportional to and polarity determined by the magnitude and sign respectively of the off target angle of the torpedo, means for resolving said first and second control signals into a resultant direct current potential applied to said control means, and means for dissociating said first means from said actuating means and associating said control means with said actuating means at a preassigned time after launching of the torpedo.

10. A steering system in accordance with claim 9 comprising means for disabling said second means in response to a signal from said target indicative of the arrival of said torpedo at a point at which said target is at a preassigned angle in the vertical dimension with respect to said torpedo.

11. A steering system for a torpedo, comprising a rudder for steering the torpedo horizontally, actuating means for deflecting said rudder laterally in one or the opposite direction, a direct current amplifier, means controlled by said amplifier for controlling said actuating means to effect deflection of said rudder in said one or opposite direction in accordance with the potential impressed upon the input circuit of said amplifier, said controlled means being normally dissociated from said actuating means, a relay having a first contact and a pair of transfer contacts, gyroscope means for controlling said relay in accordance with the direction of departure of the torpedo from a preset course, a control circuit for said actuating means including said first contact and adapted to control said actuating means in accordance with the opening and closing of said one contact, means for producing a first potential of fixed amplitude and of one polarity or the other determined by which of said transfer contacts is closed, means responsive to signals emanating from a target for producing a second potential of amplitude proportional to and polarity determined by the bearing of the target relative to the torpedo, means for resolving said first and second potentials in algebraic additive relation into a control potential applied to said input circuit, means for opening said control circuit and associating said controlled means with said actuating means at a preset time following launching of the torpedo, and means for dissociating said first potential producing means from said resolving means in response to a signal from said target indicative of the arrival of said torpedo at a point at which said target is at a preassigned angle in the vertical dimension with respect to said torpedo.

References Cited in the file of this patent

UNITED STATES PATENTS

| | | |
|---|---|---|
| 1,121,563 | Leon | Dec. 15, 1914 |
| 1,855,422 | Roussey | Apr. 26, 1932 |
| 1,892,431 | Hammond | Dec. 27, 1932 |
| 2,060,198 | Hammond | Nov. 10, 1936 |